Figure 1:
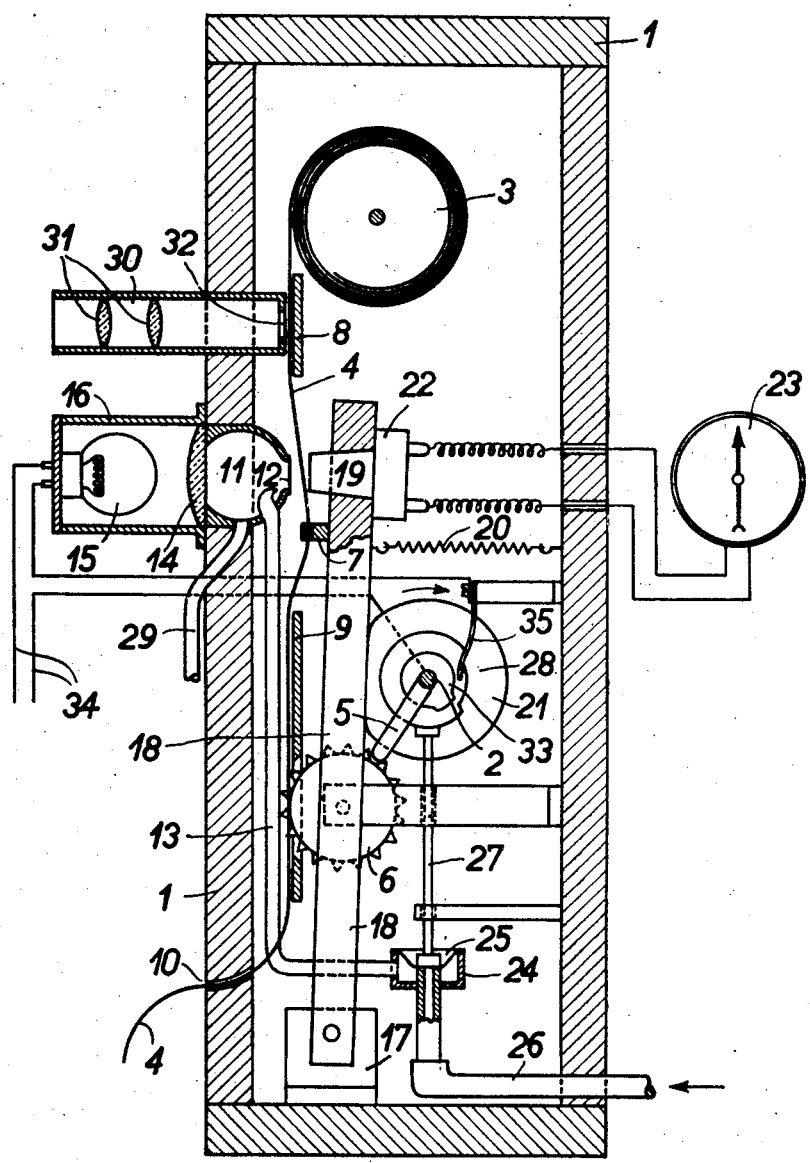

Inventor:
H. G. Lundegårdh

Inventor:
H. G. Lundegårdh

Patented Nov. 12, 1940

2,221,055

UNITED STATES PATENT OFFICE 2,221,055

APPARATUS FOR PREPARING A FILM STRIP FOR THE INSPECTION OF A SERIES OF CONSECUTIVE IMPRESSIONS OF LIGHT ON THE SENSITIVE LAYER OF SAME

Henrik Gunnar Lundegårdh, Uppsala, Sweden, assignor to the firm Carl Zeiss, Jena, Germany Application December 31, 1938, Serial No. 248,784
In Sweden January 12, 1938

3 Claims. (Cl. 95—14)

I have filed an application in Sweden, January 12, 1938.

The present invention concerns an apparatus for preparing a film strip for the inspection of a series of consecutive impressions of light on the sensitive layer of same. Apart from the well-known practice of first developing the entire film and then fixing and washing it, there exist apparatus by means of which the film parts exposed to the different impressions of light are submitted subsequently to each other to the developing and in the same sequence to the fixing and the washing process, one of these parts being washed while a next part is being fixed and a following developed. This proceeding entails the disadvantage that the film is to be displaced several times from the beginning of the development to the end of the washing in order to arrive at the places where it is struck by the sprayed liquids. Moreover, the spraying, which is to be effected continuously during the reaction of the liquids, requires comparatively large quantities of liquids and is, therefore, comparatively costly.

To overcome these disadvantages, the invention provides that the exposed film strip is intermittently so displaced in a light-tight housing that the sensitive layer of a film part having received one light impression lies during a standstill period against an aperture of a chamber which is during this period successively traversed by and drained from the developing, fixing and washing liquids, and that subsequently to the washing liquid having left the chamber, the film strip is displaced until the sensitive layer exposed to the next light impression lies against the aperture of the chamber. This chamber has conveniently a comparatively small capacity. The film consumption is very economical, because the aperture in the chamber can be made to suit any small film parts, which are so dimensioned that they are just sufficient for the reproduction of the light impressions.

A plurality of scientific and technical measurements, as for instance colorimetric and nephelometric measurements, aim at determining the differences of intensities or quantities of light, and also the quantitative spectral analysis concerns the measurement of intensities, viz. those of the spectral lines in the spectrum of the substances to be tested. For the sake of as quick an examination as possible it is therefore advisable to combine the examining process and the method in such a manner that, subsequently to the fixing solution having been drained from the chamber, the fixed film part is exposed in this chamber to light of definite intensity before it is displaced again, the quantity of the light traversing the film being measured by a photometer. Apart from the fact that the result of the examination is thus at disposal before the completion of the treatment of the film, the photographic image can be preserved for an indefinite time as a test record. The film is submitted to photometry in wet state, and its drying need not be waited for. The photometric measurement does not even require the chamber to be empty. Great economy of time is arrived at when the photometric measurement is made at the time when the washing water is circulating in the chamber.

The method can be further improved by submitting the film to treatment not subsequently to one series having received all light impressions or the entire film having been exposed to such impressions, but by placing the film strip lying in the light-tight housing into a path of light rays before this strip is made to close the said chamber, these rays imparting to this strip during the standstill period a light impression to be examined.

For carrying the method into practice, it is advantageous to use an apparatus which has a light-tight housing containing a holder and a guide for the film strip, a receiver having a supply and a draining tube and a plane-rimmed aperture, a continuously rotatable driving organ, a device for changing the continuous rotation of this organ to an intermittent displacement of the film strip, a device for controlling the supply of different liquids into the supply tube of the receiver, this device being coupled to the said organ, and a device for pressing the film strip during the standstill period against the plane rim of the aperture of the receiver, this other device being coupled to the said changing device. In an apparatus constructed as above, the film is treated entirely automatically. Even the photometric inspection can be automatic, if use is made of an electric light-source illuminating the aperture of the receiver from the interior of this receiver, and if there is coupled to the driving organ a device for closing the circuit of the light-source during part of the said standstill period of the film strip, and if, further, use is made of a photometer for measuring the quantity of light traversing the film part lying against the aperture of the receiver. If the housing has a window giving access to light for influencing the film part between the holder and the aperture in the receiver, the apparatus permits the development and inspection of any film part immediately after the exposure of same. Accordingly, series of any number of exposures can be treated and examined, regardless of the entire length of the film strip at disposal.

Figure 2:
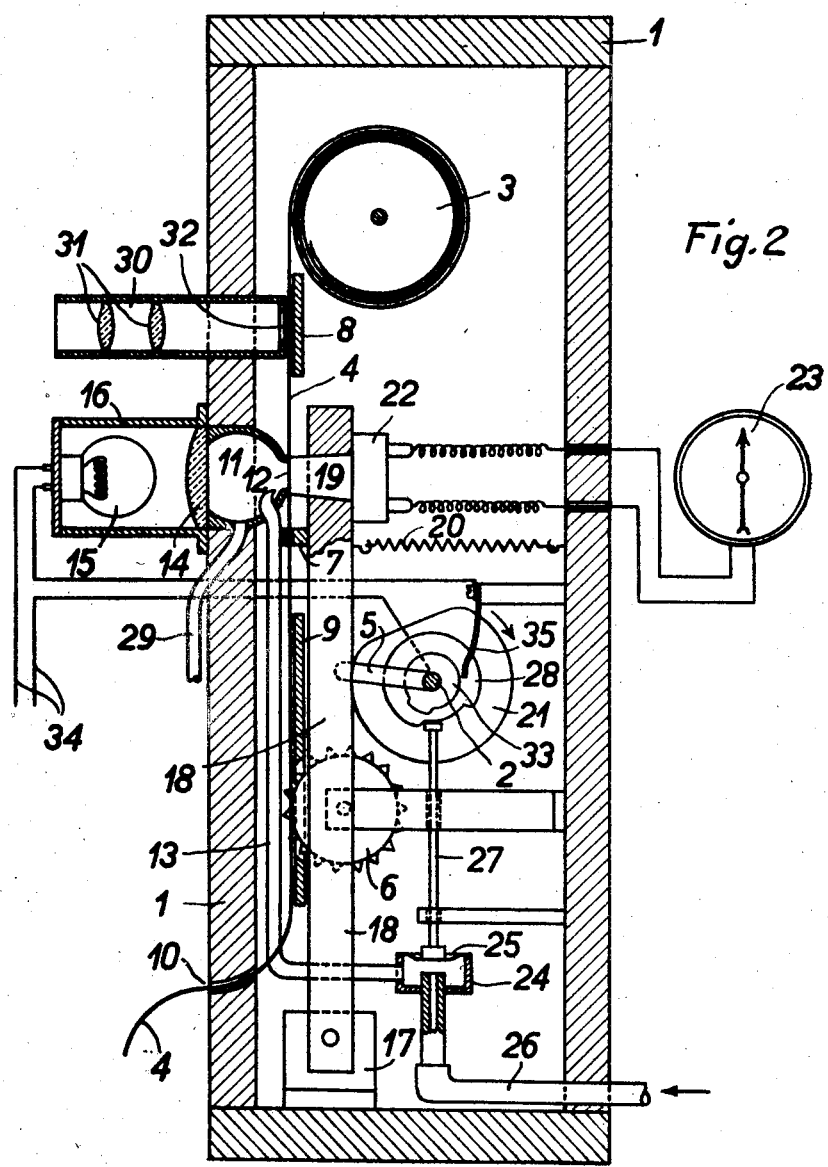
Figure 3:
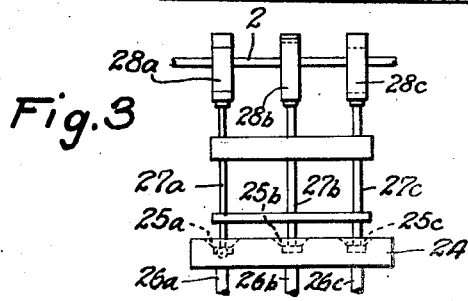

The Figures 1 to 3 of the accompanying drawings show schematically an apparatus constructed according to the invention, Figures 1 and 2 being elevational sections and illustrating two different working phases, Figure 3 being a side view of parts of the apparatus.

In a light-tight housing 1 is mounted a driving axle 2 which is continuously rotatable from outside. The housing 1 contains in its upper part a device for holding a film strip 4, which may be for instance a spool 3. Any complete revolution of the axle 2 causes an arm 5 fast with the axle 2 to displace by one tooth a toothed wheel 6 mounted in the housing. The toothed wheel 6 engages the perforation of the film strip 4, which is guided by a slot 7 and two plates 8 and 9 and leaves the housing through an aperature 10. The wall of the housing 1 is provided with a light-tight receiver 11, which is approximately spherical and has a plane-rimmed aperture 12 whose rim lies in the plane of the guide plates 8 and 9. Into the receiver 11 extends a supply tube 13, the end of which is bent in such a manner that the liquid leaving this tube first arrives at the aperture 12 and, when this aperture is closed, causes a rapid circulation of the liquid in the receiver. Part of the wall of the receiver 11 is constituted by a lens 14 lying near an incandescent lamp 15 disposed in a lamp housing 16 connected to the exterior wall of the housing 1. On a support 17 fast with the bottom of the housing 1 is pivoted an arm 18 capable of slight motion about this pivot and holding a tube 19 which lies opposite the receiver 11 and whose end next to the aperture 12 corresponds to the rim of this aperture. By means of a spring 20 the arm 18 is continuously kept in contact with a cam 21 fast with the driving axle 2. The arm 18 carries the slotted part 7 and a photoelectric cell 22 lying against that end of the tube 19 which is remote from the aperture 12. The cell 22 is electrically connected to a galvanometer 23. The supply tube 13 is in communication with a tank 24 having three membrane valves 25a, 25b and 25c for supply tubes 26a, 26b and 26c, respectively. These valves are operated by stems 27a, 27b and 27c, respectively, to which belong cams 28a, 28b and 28c, respectively, fast with the axle 2. To the lowest part of the receiver 11 is connected a draining tube 29. Above the receiver 11, the wall of the housing 1 is traversed by a tube 30 containing an optical system 31. At its one end this tube 30 is closed by a transversal plate containing a gate 32 the size of which corresponds to that of one film image. The driving axle 2 bears a cam 33 and is electrically connected to the one pole of a circuit 34 containing the lamp 15. The other pole of the circuit 34 is connected to a leaf spring 35, which is so positioned that the cam 33 closes the circuit for a definite period of time at each revolution of the axle 2.

The driving axle 2 is assumed to be connected by a suitable reduction gear to a synchronous motor or the like (not shown), which drives this axle at constant angular speed in such a manner that it effects one complete revolution in four minutes. This period of time is needed approximately for the complete treatment of one film part. Subsequently to a film strip 4 having been placed on the holding device 3 and the toothed wheel 6 having been made to engage the perforation of the end of this strip, the axle 2 is made to rotate by connection of the synchronous motor to a supply. Each revolution of the axle 2 causes the arm 5 to rotate the toothed wheel 6 through an angle corresponding to one tooth, the film strip being thus displaced by the breadth of one image. When the film strip 4 is at rest, the optical system 31 imparts to it a light impression which is of the size of the window 32 and can be produced for instance by a spectrograph placed in front of this system 31.

When the film strip 4 is being displaced, the arm 18 assumes the position shown in Figure 1, since the cam 21 enables the spring 20 to turn the arm towards the right. As soon as the arm 5 is out of engagement with the toothed wheel 6, the feed of the film strip 4 is interrupted, and the arm 18 is so turned by the cam 21 that the tube 19 presses the film 4 against the rim of the receiver 11 (Figure 2). The aperture 12 of the receiver 11 having thus been closed, the valve stem 27a rises and the membrane valve 25a permits the access of the developing solution coming from a storage tank. This solution arrives in the receiver 11 by way of the tubes 26a and 13 and develops the light-sensitive layer of the film part on the aperture 12. After the developing process, the valve 25a is closed through the agency of the corresponding cam 28, and the cam 28b and the valve 25b come into operation, the fixing solution being thus admitted to the receiver 11 after the developing solution has left the same. This process is repeated once more by the cam 28c and the valve 25c, which permits the entry of the washing water into the receiver 11. When the valve 25c is open, the cam 33 closes the circuit of the incandescent lamp 15, the light of which is concentrated by the lens 14 on the film part lying against the aperture 12. Part of this light traverses the film 4 and arrives in the photoelectric cell 22, which causes the index of the galvanometer 23 to deflect. The magnitude of this deflection is a measure for the quantity of light traversing the film part in question.

After the photometric measurement, the circuit 34 is interrupted. Subsequently to the completion of the washing of the film part, the valve 25c is closed, and the residual washing water in the receiver 11 is drained by the tube 29. The cam 21 has been rotated in the meantime to such an extent that the arm 18 reassumes the position shown in Figure 1. Turning this arm causes the slot part 7 to withdraw the film 4 from the receiver 11, and the process beginning with the feed of the film strip 4 is repeated.

It is advisable to use for the treatment of the film quickly acting liquids, viz. a very active developing solution and a rapid fixing bath, so that the treatment requires four minutes only. The cams 21, 28a, 28b and 28c are so constructed that the development and the fixing require approximately ⅜ of the time of revolution of the driving axle 2, viz. about 1½ minutes, the washing approximately $\tfrac{3}{16}$ of this time, viz. ¾ minute, and the feed $\tfrac{1}{16}$, viz. ¼ minute. It is possible, however, to divide the time at disposal in a different manner, according to the chemical compositions of the used liquids, or to make the total period last longer or shorter than four minutes by altering the time of revolution of the axle 2.

I claim:

1. An apparatus for preparing a film strip for the inspection of a series of consecutive impressions of light on the sensitive layer of same, said apparatus comprising a light-tight housing, said housing containing a holder for said film strip, means for intermittent displacement of said film strip, these means including a shaft rotatably mounted in said housing, a receiver having an aperture facing the sensitive layer of said film strip, the rim of said aperture being plane, means, coupled to said shaft, for pressing said film strip, when being in stillstand, against said rim, a system of tubes for supplying liquids, adapted to developing, fixing and washing said film strip, to said receiver, an outlet in said receiver enabling said liquids to be removed off, means for stopping the supply of liquids to said receiver, and means, coupled to said shaft, for controlling said stopping means.

2. In an apparatus according to claim 1, means, including an electric light source, for sending light through said film strip at the place of said aperture, means, coupled to said shaft, for the control of the current feeding said light source, and a device for photometrically measuring the quantity of light traversing said film strip.

3. In an apparatus according to claim 1, said housing having an opening for receiving means for the exposure of said film strip.

HENRIK GUNNAR LUNDEGÅRDH.